United States Patent
Liu et al.

(10) Patent No.: US 11,302,102 B2
(45) Date of Patent: Apr. 12, 2022

(54) METHOD FOR CONTROLLING DISPLAY PANEL AND CONTROL CIRCUIT USING THE SAME

(71) Applicant: NOVATEK Microelectronics Corp., Hsin-Chu (TW)

(72) Inventors: Ping Liu, Hsinchu (TW); Wu-Wei Lin, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/089,667

(22) Filed: Nov. 4, 2020

(65) Prior Publication Data
US 2021/0224505 A1 Jul. 22, 2021

Related U.S. Application Data

(60) Provisional application No. 62/964,137, filed on Jan. 22, 2020.

(51) Int. Cl.
| | |
|---|---|
| *G06V 40/10* | (2022.01) |
| *G06V 20/40* | (2022.01) |
| *H04L 67/12* | (2022.01) |
| *G09G 3/36* | (2006.01) |
| *G06V 10/147* | (2022.01) |
| *G06V 40/13* | (2022.01) |
| *G06V 40/12* | (2022.01) |

(52) U.S. Cl.
CPC ............ *G06V 20/46* (2022.01); *G06V 10/147* (2022.01); *G06V 40/1318* (2022.01); *G06V 40/1347* (2022.01); *G09G 3/3614* (2013.01); *H04L 67/12* (2013.01)

(58) Field of Classification Search
CPC ..................................................... G06K 9/0004
See application file for complete search history.

(56) References Cited

U.S. PATENT DOCUMENTS

| | | | | |
|---|---|---|---|---|
| 2011/0012879 A1* | 1/2011 | Uehata | .................. | G06F 3/0421 345/207 |
| 2012/0313913 A1* | 12/2012 | Shiraki | .................. | G06F 3/0412 345/207 |
| 2014/0204055 A1* | 7/2014 | Lu | .......................... | G06F 3/0445 345/174 |
| 2019/0235663 A1* | 8/2019 | Xuan | ...................... | G06F 3/044 |

* cited by examiner

*Primary Examiner* — Joseph R Haley
(74) *Attorney, Agent, or Firm* — Winston Hsu

(57) ABSTRACT

The present invention provides a method of a control circuit for controlling a fingerprint sensing operation of a display panel. The fingerprint sensing operation includes a reset operation, an exposure operation and a sample operation. The method includes steps of: performing the reset operation, the exposure operation and the sample operation of a fingerprint sensing cycle during a display frame interval in which a polarity of display data voltage on the display panel remains unchanged; and adjusting an exposure time of the exposure operation to be within the display frame interval.

8 Claims, 8 Drawing Sheets

Positive polarity frame    Negative polarity frame

Frame inversion

FIG. 3A

Positive polarity frame    Negative polarity frame

Column inversion

FIG. 3B

Positive polarity frame    Negative polarity frame

Dot inversion

FIG. 3C

METHOD FOR CONTROLLING DISPLAY PANEL AND CONTROL CIRCUIT USING THE SAME

CROSS REFERENCE TO RELATED APPLICATIONS

This application claims the benefit of U.S. Provisional Application No. 62/964,137, filed on Jan. 22, 2020, the contents of which are incorporated herein by reference.

BACKGROUND OF THE INVENTION

1. Field of the Invention

The present invention relates to a method for controlling a display panel, and more particularly, to a method for controlling a display panel capable of fingerprint sensing and a related control circuit.

2. Description of the Prior Art

Fingerprint sensing technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user only needs to put his/her finger on a fingerprint sensor to login the electronic device instead of entering long and tedious username and password.

In general, a display panel capable of fingerprint sensing is usually equipped with touch sensing functions. In order to prevent mutual interferences between display, touch sensing and fingerprint sensing, these functions may be performed based on time division. The time division scheme allows the panel to show a satisfactory image, while the touch behavior is effectively received and the fingerprint image is correctly recognized.

In order to realize the time division scheme for fingerprint sensing, an original display frame interval is divided into a display image frame and a skip frame, where the display image frame includes respective time slots allocated to display or touch sensing, and the skip frame is allocated to fingerprint sensing. The fingerprint sensing procedure requires reset, exposure and sample operations performed on each sensing pixel on the panel, where the related operations such as capturing the reset signals and image signals should be performed in the skip frame.

In a liquid crystal display (LCD) panel, a polarity inversion scheme is usually applied to prevent the liquid crystal molecules from being permanently polarized. According to polarity inversion, a display pixel is requested to receive display data voltages having positive polarity and negative polarity alternately. The display data voltages having positive polarity are those greater than the common voltage on the common electrode, and the display data voltages having negative polarity are those smaller than the common voltage on the common electrode.

However, if the time division scheme for fingerprint sensing is applied to the LCD panel having polarity inversion, the fingerprint sensing result may easily be interfered with by polarity inversion. For example, please refer to FIG. 1, which is a schematic diagram of an operation timing of a general LCD panel. As shown in FIG. 1, each display frame interval is divided into a display image frame and a skip frame following the display image frame. The fingerprint sensing operations should be performed in the skip frame. More specifically, the reset and sample operations are requested to be performed in the skip frame, and the exposure period may pass through the display image frame and the skip frame time. Based on polarity inversion, the display image frames appear to be positive, negative, positive, and negative polarities in turn. Since display data voltages of a display image frame are maintained until the next display data voltages arrive in the next display image frame, the skip frame may have the same polarity as its previous display image frame.

As shown in FIG. 1, the exposure operation is performed following each reset (RST) operation, and then fingerprint images are sampled (SMP) after the exposure period; that is, if the reset operation is performed in a skip frame, the sample operation should be performed in the next skip frame. Therefore, the exposure operation should undergo a polarity change, e.g., from positive to negative or from negative to positive. The polarity change may easily interfere with the sensed fingerprint signals, reducing the recognition rate of the fingerprint images. Also, the fingerprint operations should be performed in the allocated skip frames, resulting in a limitation on the adjustment of exposure time. Thus, there is a need to provide a novel fingerprint sensing scheme, which is immune to the interferences of polarity change of the display data and also achieves more flexible exposure time adjustment.

SUMMARY OF THE INVENTION

It is therefore an objective of the present invention to provide a method for controlling a display panel capable of fingerprint sensing and a related control circuit, in order to solve the abovementioned problems.

An embodiment of the present invention discloses a method of a control circuit, for controlling a fingerprint sensing operation of a display panel. The fingerprint sensing operation comprises a reset operation, an exposure operation and a sample operation. The method comprises steps of: performing the reset operation, the exposure operation and the sample operation of a fingerprint sensing cycle during a display frame interval in which a polarity of display data voltage on the display panel remains unchanged; and adjusting an exposure time of the exposure operation to be within the display frame interval.

Another embodiment of the present invention discloses a control circuit, for controlling a fingerprint sensing operation of a display panel. The fingerprint sensing operation comprises a reset operation, an exposure operation and a sample operation. The control circuit is configured to perform the following steps: performing the reset operation, the exposure operation and the sample operation of a fingerprint sensing cycle during a display frame interval in which a polarity of display data voltage on the display panel remains unchanged; and adjusting an exposure time of the exposure operation to be within the display frame interval.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3A-3C are schematic diagrams of polarity inversion of pixel voltages.

DETAILED DESCRIPTION

Figure 2:
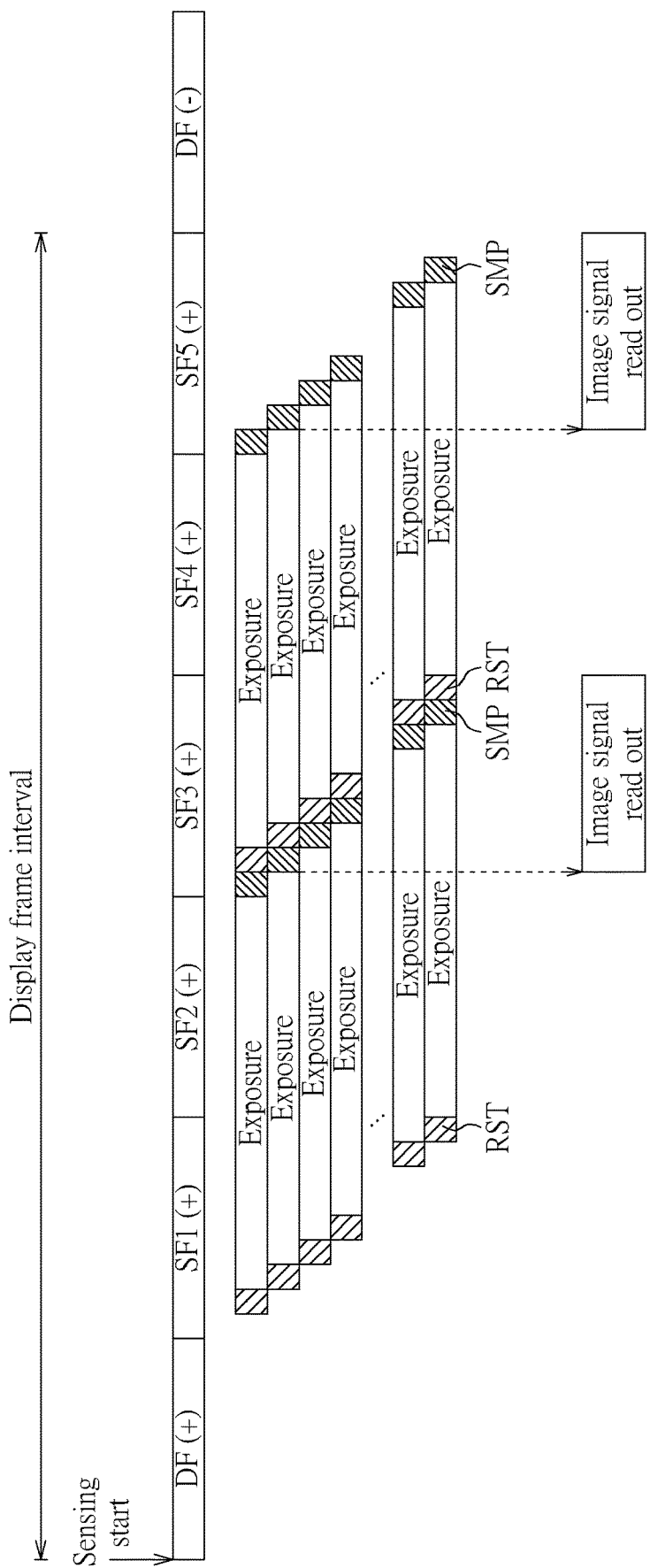
FIG. 2 is a schematic diagram of an operation timing of a display panel according to an embodiment of the present invention.

Please refer to FIG. 2, which is a schematic diagram of an operation timing of a display panel according to an embodiment of the present invention. The display panel may be a liquid crystal display (LCD) panel implemented with a polarity inversion scheme. As shown in FIG. 2, a display frame interval may include a display image frame DF and a plurality of consecutive skip frames SF1-SF5 following the display image frame DF, where the skip frames SF1-SF5 are allocated to fingerprint sensing operations. The display data voltages having positive polarity are received in the display image frame DF, and thus this display image frame DF and the skip frames SF1-SF5 following the display image frame DF all have positive polarity (called the positive polarity frames). More specifically, the display data voltages with positive polarity are maintained until the corresponding scan cycles of the next display image frame DF.

Figure 1:
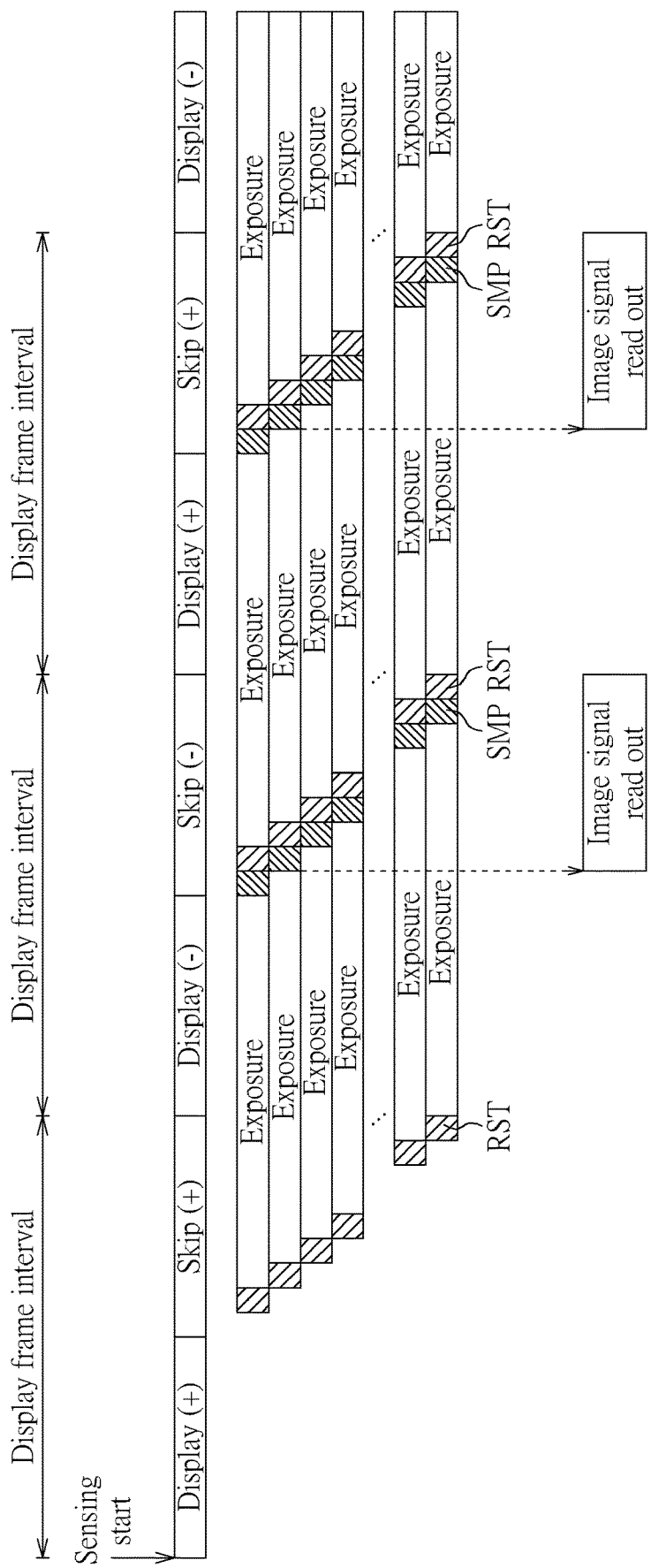
FIG. 1 is a schematic diagram of an operation timing of a general LCD panel.

As mentioned above, in the conventional operation timing as shown in FIG. 1, the exposure period crosses multiple display frame intervals and thus undergoes a polarity change from positive to negative or from negative to positive, such that the fingerprint image signals are interfered with by the display data voltages having polarity change. In order to prevent the interferences, in the embodiments of the present invention, the fingerprint sensing operations including the reset, exposure and sample operations are performed during the skip frames SF1-SF5 in the same display frame interval where the polarity of display data voltages remain unchanged. More specifically, if the reset operation is performed in a positive polarity frame, the follow-up sample operation in the same fingerprint sensing cycle should also be performed in a positive polarity frame, and the exposure period therebetween is entirely within positive polarity frame(s). On the other hand, if the reset operation is performed in a negative polarity frame, the follow-up sample operation in the same fingerprint sensing cycle should also be performed in a negative polarity frame, and the exposure period therebetween is entirely within negative polarity frame(s). Further, the adjustment of exposure time should also be in the same display frame interval having identical polarity, such as within the skip frames SF1-SF5. In such a situation, the received fingerprint image signals may not be interfered with by the polarity change of display data; hence, the quality of the fingerprint images may be improved, allowing the fingerprint images to be more recognizable.

There are various polarity inversion schemes commonly used in the LCD panel, such as the frame inversion, row inversion, column inversion, and dot inversion. FIG. 3A illustrates the frame inversion, where in a positive polarity frame, all pixels (or subpixels) receive positive polarity voltages, and in a negative polarity frame, all pixels (or subpixels) receive negative polarity voltages. FIG. 3B illustrates the column inversion, where the polarity of data voltages changes column by column, and the polarity in each pixel (or subpixel) changes from frame to frame. FIG. 3C illustrates the dot inversion, where every two adjacent pixels (or subpixels) have different polarities, and the polarity in each pixel (or subpixel) changes from frame to frame. Note that in the column inversion and dot inversion schemes as shown in FIGS. 3B and 3C, there are several pixel voltages having positive polarity and several pixel voltages having negative polarity in each frame, and two polarity allocations of frame are generated in the column inversion or dot inversion. To facilitate the illustrations, the frame polarity may be defined based on a representative subpixel of the frame, such as the subpixel at the upper left corner. For example, if the subpixel at the upper left corner receives a positive polarity voltage in a display image frame, this frame will be regarded as a positive polarity frame; if the subpixel at the upper left corner receives a negative polarity voltage in a display image frame, this frame will be regarded as a negative polarity frame.

Therefore, no matter which polarity inversion scheme is applied, as for each pixel, the polarity of display data voltage will change frame by frame to prevent permanent polarization of the liquid crystal molecules; hence, the fingerprint image signals may be interfered with by the polarity change if the exposure period crosses different display image frames. In the embodiments of the present invention, a fingerprint sensing operation is completely performed during a display frame interval, i.e., during the skip frames of the same display frame interval; hence, the polarity of display data voltages will not change during the fingerprint sensing operation. This reduces or eliminates the interferences on fingerprint images caused by polarity change of display data. As a result, the fingerprint image signals may be more immune to noise interferences and the quality of fingerprint images will be better.

As mentioned above, the reset and sample operations should be performed in the skip frames. In general, the fingerprint image signals are received from a plurality of sensing pixels arranged as an array, and the signals may be read out by the control circuit row by row, as shown in FIG. 2. Each row is scanned in turn, to read out (i.e., sample) the fingerprint image signals of an entire image frame, and the reset operation for the next fingerprint sensing operation is performed afterwards. In this embodiment, the first frame of fingerprint image signals is completely read out within the skip frame SF3, and the reset operations for next fingerprint sensing operation are also completed in the skip frame SF3. The second frame of fingerprint image signals is completely read out within the skip frame SF5.

Figure 4:
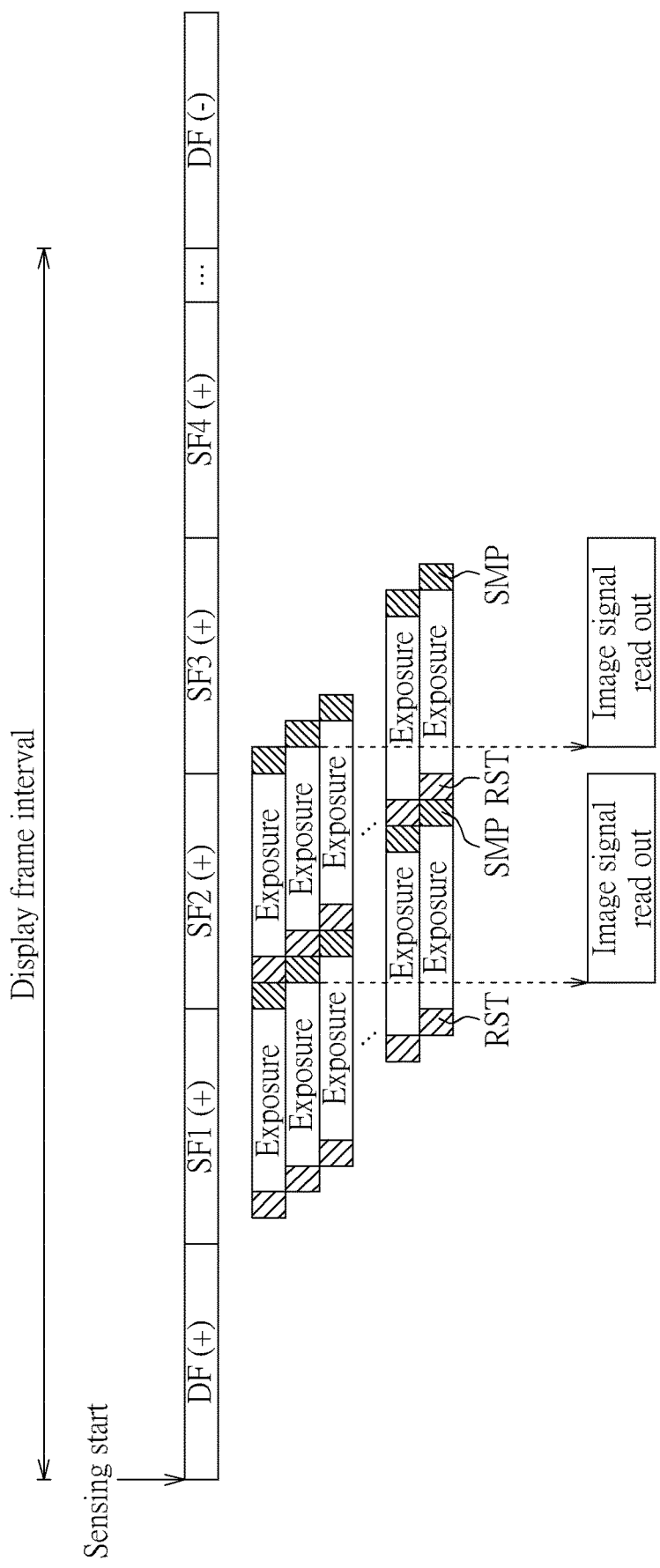
FIG. 4 illustrates an operation timing of a display panel under strong light intensity.

In an embodiment, the exposure time may be adjusted to be adapted to ambient light intensity or based on brightness settings, as long as the sample operation after the exposure period is within the configured skip frames. For example, in the embodiment shown in FIG. 2, the exposure time equals 2 frame times. In another embodiment, different lengths of exposure time may also be feasible. FIG. 4 illustrates an operation timing of a display panel under strong light intensity, where the exposure time is decreased to 1 frame time to be adapted to the strong light intensity.

Please note that in the conventional operation timing of the display panel with fingerprint sensing functions as shown in FIG. 1, the time division scheme requires that the fingerprint sensing operations should be completely performed in the skip frames. As a result, if the reset operation of each row is performed in the first skip frame, the corresponding sample operation should be performed in the second or subsequent skip frame, such that the length of the exposure time should be longer than 2 frame times; otherwise, the sample operation of all rows cannot be completed in the skip frames. This limits the possibility and feasibility of exposure time, especially shorter exposure time for brighter ambient light. In comparison, in the present invention, multiple consecutive skip frames are configured in the display frame interval, allowing the fingerprint sensing operations for each row to be completed in the skip frames more flexibly. For example, under an extremely strong ambient light intensity, the length of the exposure time may even be shorter than 1 frame time.

Figure 5:
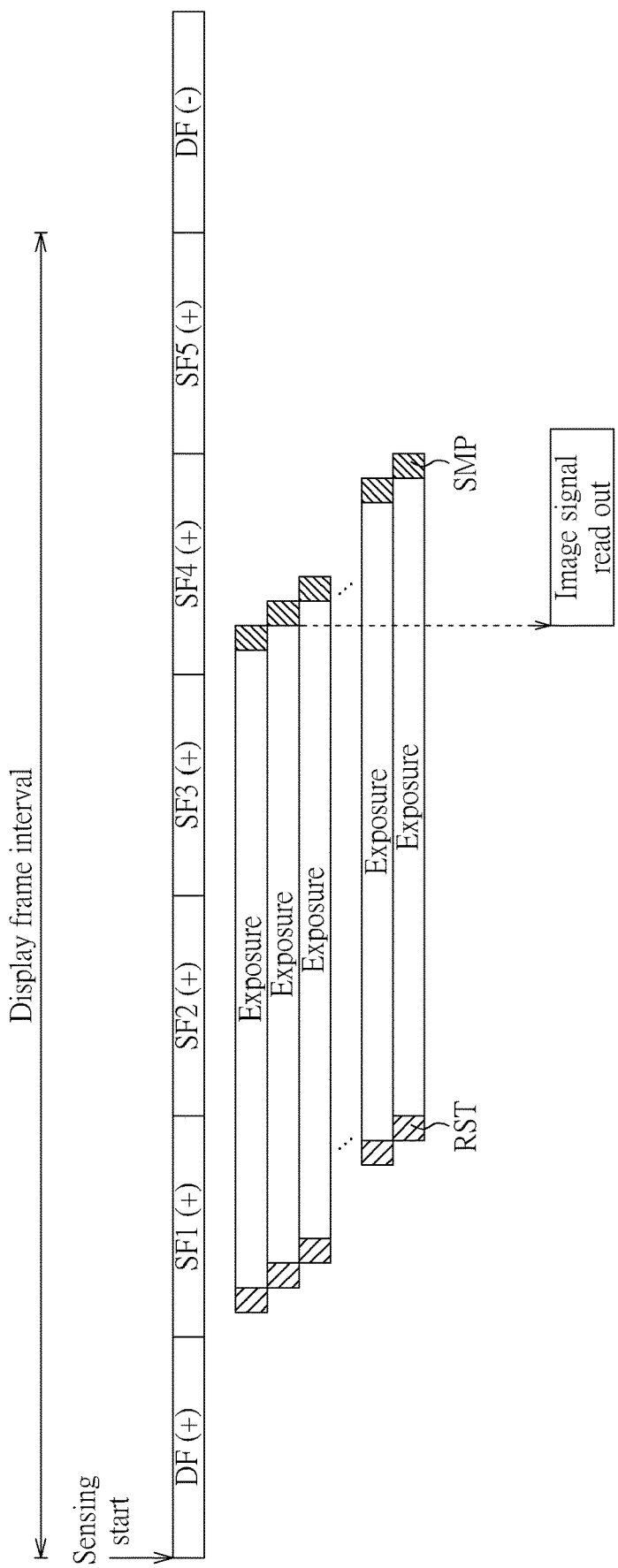
FIG. 5 illustrates an operation timing of a display panel under weak light intensity.

FIG. 5 illustrates an operation timing of a display panel under weak light intensity, where the exposure time is increased to 3 frame times to be adapted to the weak light intensity. In this embodiment, 5 consecutive skip frames SF1-SF5 allow the longer exposure time to be feasible and the fingerprint operations are completed without undergoing polarity change.

In the conventional operation timing of the display panel with fingerprint sensing functions as shown in FIG. 1, if the length of each display frame interval (having one display image frame and one skip frame) equals 32 milliseconds (ms), the exposure time should be a multiple of 32 ms; that is, 32, 64, 96 ms, etc. In comparison, in the embodiment as shown in FIG. 5, the length of the exposure time equals 3 skip frames, i.e., 48 ms. In other words, the exposure time may be configured more flexibly within the consecutive skip frames, no matter in stronger or weaker light intensity.

Figure 6:
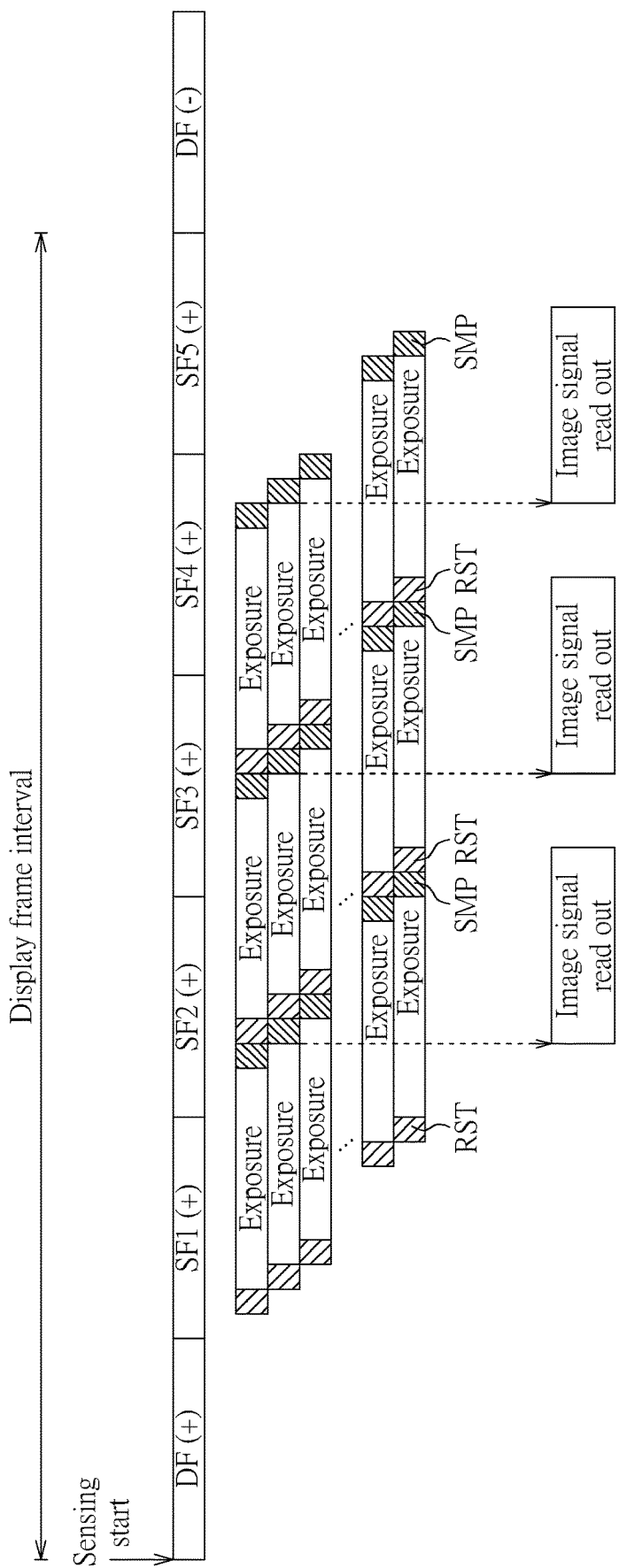
FIG. 6 is a schematic diagram of an operation timing of a display panel according to an embodiment of the present invention.

In another embodiment, the exposure time may be different from any multiple of the length of the skip frames SF1-SF5, i.e., to be different from 16, 32, 48, 64 ms, etc. In other words, the length of the exposure time does not need to be in the unit of frame time. For example, please refer to FIG. 6, which is a schematic diagram of an operation timing of a display panel according to an embodiment of the present invention. As shown in FIG. 6, the time resources of skip frames SF1-SF5 are shared by 3 fingerprint sensing cycles for reading out 3 frames of fingerprint image signals, and the exposure time is longer than 1 frame time but shorter than 2 frame times.

As shown in FIG. 6, in the skip frames SF1-SF5, 3 image frames of fingerprint signals are obtained, which means that the fingerprint sensing operations of 3 cycles are performed during the skip frames SF1-SF5 of the same display frame interval. The fingerprint image signals in these 3 image frames may be merged or combined, in order to obtain a more accurate fingerprint sensing result. In this embodiment, the 3 image frames of fingerprint signals may be averaged to obtain the fingerprint sensing result. Also, as shown in FIGS. 2 and 4, the fingerprint sensing operations are performed by 2 times (i.e., 2 fingerprint sensing cycles) in the skip frames SF1-SF5; hence, the obtained fingerprint image signals in these 2 image frames may also be averaged. The signal-to-noise ratio (SNR) of the fingerprint image may be enhanced with the combination of fingerprint image signals in multiple frames.

In the conventional operation timing of the display panel with fingerprint sensing functions as shown in FIG. 1, as for the combination of image signals of multiple fingerprint sensing cycles for the purpose of higher SNR, the fingerprint sensing operation in each cycle may be completed in different display frame intervals, and several display image frames in which fingerprint sensing operations cannot be performed are inserted between the skip frames. This requires a longer sensing time and may thus result in poor user experience of fingerprint sensing. In comparison, in the embodiments of the present invention, multiple fingerprint sensing cycles may be completed in the consecutive skip frames, which is time-saving and may achieve higher flexibility. In addition, since the multiple fingerprint image frames for average are obtained in the same display frame interval having the same polarity, the finally obtained fingerprint sensing result may achieve higher accuracy.

Please note that in the embodiments of the present invention, the number and time length of skip frames may be much more than the display image frame in the same display frame interval. In such a situation, the fingerprint sensing operations may occupy more time, causing the display frame rate to be reduced. However, during the fingerprint sensing operations under image display, the screen may show a specific image or icon (which may include a light spot) indicating the position for sensing the finger, and the image or icon may be still for a period of time until the fingerprint sensing result is obtained; that is, the display image may not change for a period of time. The still image may still be displayed normally under a lower frame rate. It should also be noted that, as for an LCD panel, if the display frame interval having the same polarity (i.e., the polarity of display data voltages does not change) lasts for an excessively long time, the liquid crystal molecules in pixels may still be permanently polarized. The maximum feasible number of consecutive skip frames may be different in various types of LCD panels, based on their tolerance and limitation of polarization. As long as multiple consecutive skip frames are configured in the same display frame interval without polarity change and the fingerprint operations are completed in these skip frames, the implementations should belong to the scope of the present invention.

Figure 7:
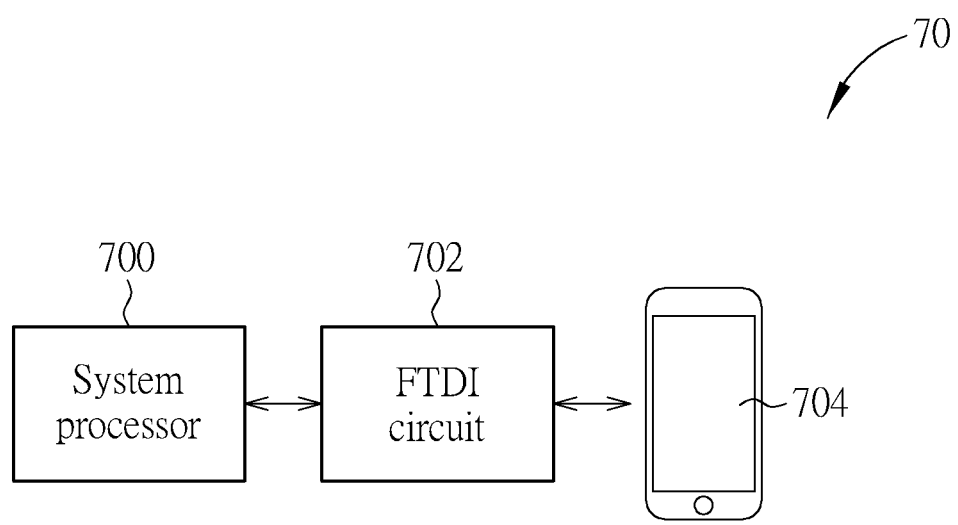
FIG. 7 is a schematic diagram of a display system according to an embodiment of the present invention.

The configurations of operation timing of the display panel may be realized through a control circuit, such as a fingerprint, touch and display integration (FTDI) circuit. The FTDI circuit may be implemented in a single chip integrated with processing circuits for display, touch and fingerprint sensing operations. Please refer to FIG. 7, which is a schematic diagram of a display system 70 according to an embodiment of the present invention. As shown in FIG. 7, the display system 70 includes a system processor 700, an FTDI circuit 702 and a display panel 704. The system processor 700 may be a core processor of the display system 70, such as a central processing unit (CPU), a microcontroller unit (MCU), a microprocessor, or the like. As for a smart phone, the system processor 800 may be an MCU configured to control various applications and operations of the smart phone. Note that the algorithm for fingerprint recognition is usually quite complex, such that fingerprint matching and determination should be performed in the system processor 700 having larger computation resources and may not be easily realized in the FTDI circuit 702. The FTDI circuit 702 aims at capturing or extracting the fingerprint image received from the display panel 704, and processing the received fingerprint image signals to amplify and acquire the desired peak-to-valley data. In another embodiment, the FTDI circuit 702 may be realized with a 2-chip implementation including a touch and display driving integration (TDDI) circuit and a fingerprint readout circuit.

The FTDI circuit 702 may include a source driver for providing control signals and display data voltages for the display panel 704. In general, the display, touch and fingerprint sensing functions may share the same output drivers, and this makes the time division of the display, touch sensing and fingerprint sensing operations more necessary.

Please note that the present invention aims at providing a method for controlling a display panel capable of fingerprint sensing by configuring multiple consecutive skip frames in a display frame interval. Those skilled in the art may make modifications and alterations accordingly. For example, in the above embodiments, the control method is implemented for an LCD panel, where the polarity change of display data voltages may interfere with the fingerprint image signals. In another embodiment, the control method of the present invention is applicable to another type of display panel such as an organic light-emitting diode (OLED) panel. Even if the OLED panel does not have the polarity issue, the change of data voltages during exposure may still interfere with the fingerprint image signals. Therefore, it is preferable to complete the reset, exposure and sample operations of the same fingerprint sensing cycle in the same display frame interval without change of display data voltages. In addition, the number of consecutive skip frames and the time length of each skip frame may be configured based on system requirements under the limitations of the display panel, and should not be used to limit the scope of the present invention.

Figure 8:
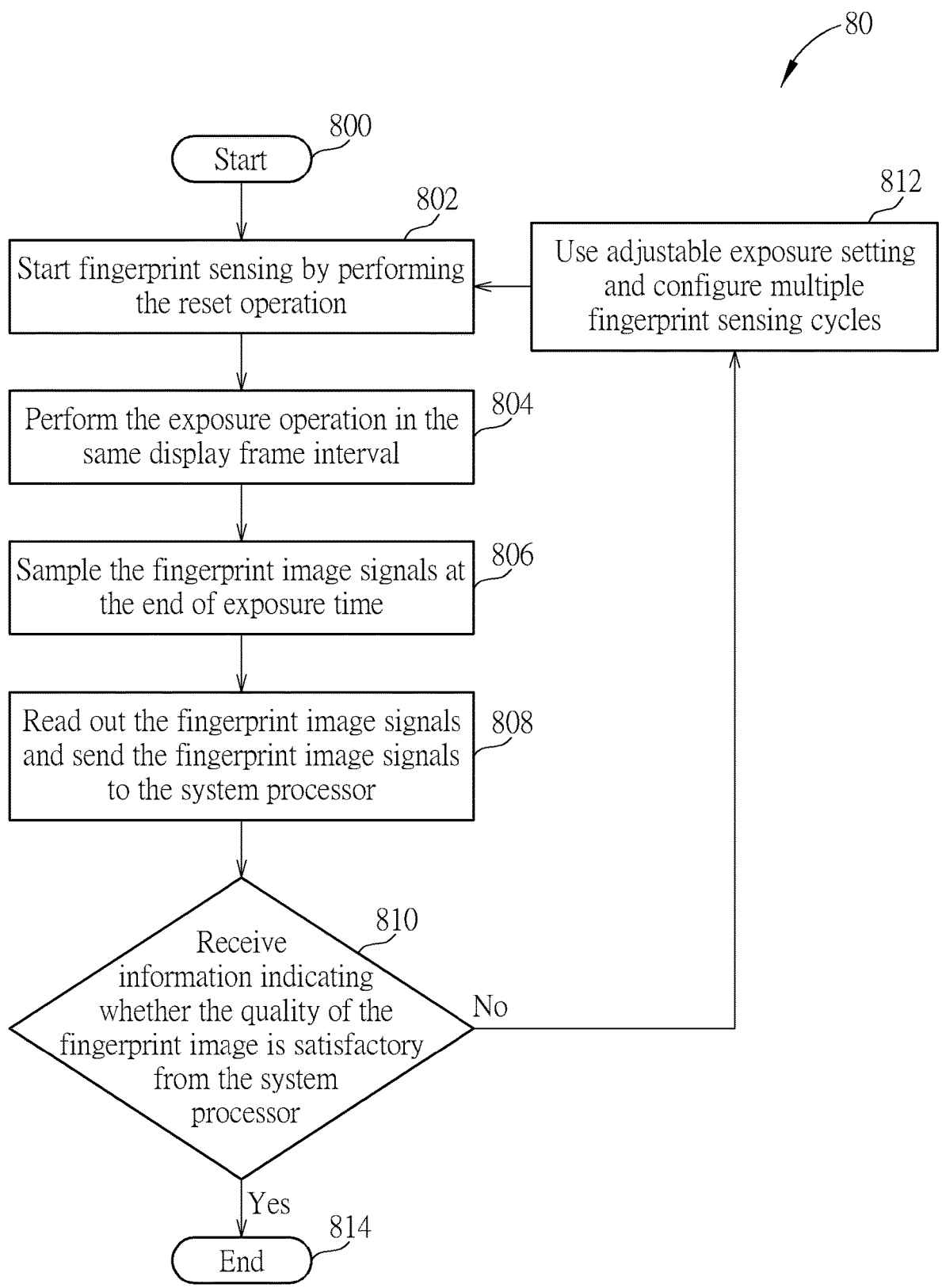
FIG. 8 is a flowchart of a control process for the fingerprint sensing operation of a display panel according to an embodiment of the present invention.

Please refer to FIG. 8, which is a flowchart of a control process 80 for the fingerprint sensing operation of a display panel according to an embodiment of the present invention. The control process 80 may be realized in a control circuit for the display panel such as the FTDI circuit 80 shown in FIG. 8. As shown in FIG. 8, the control process 80 includes the following steps:

Step 800: Start.

Step 802: Start fingerprint sensing by performing the reset operation.

Step 804: Perform the exposure operation in the same display frame interval.

Step 806: Sample the fingerprint image signals at the end of exposure time.

Step 808: Read out the fingerprint image signals and send the fingerprint image signals to the system processor.

Step 810: Receive information indicating whether the quality of the fingerprint image is satisfactory from the system processor. If yes, go to Step 814; otherwise, go to Step 812.

Step 812: Use adjustable exposure setting and configure multiple fingerprint sensing cycles. Then go to Step 802.

Step 814: End.

According to the control process 80, the FTDI circuit may perform the reset, exposure and sample operations of fingerprint sensing during the same display frame interval in which the polarity of display data voltages on the panel remains unchanged. The FTDI circuit then reads out the fingerprint image signals to be sent to the system processor, which performs fingerprint recognition based on the fingerprint image signals. Further, the system processor may determine the quality of the fingerprint image. If the image quality is determined to be unsatisfactory, the FTDI circuit may adjust the exposure setting, e.g., adjust the exposure time to an appropriate level based on the ambient light intensity. Alternatively or additionally, the FTDI circuit may perform the fingerprint sensing operations of multiple cycles, to obtain multiple fingerprint image frames. These fingerprint image frames may be combined or averaged to generate a more accurate fingerprint sensing result. Other detailed operations and alterations of the control process 80 are illustrated in the above paragraphs, and will not be narrated herein.

To sum up, the present invention provides a control method for a display panel capable of fingerprint sensing. The operation timing of the display panel is configured so that each display frame interval may include multiple consecutive skip frames following the display image frame. The reset, exposure and sample operations of one or more fingerprint sensing cycles may be completed in the consecutive skip frames of the display frame interval. Since the polarity of display data voltages on the panel remains unchanged during the display frame interval, the fingerprint sensing operations will not be interfered with by the polarity change of display. Further, the length of exposure time may be configured flexibly within the consecutive skip frames; hence, an appropriate exposure time may be configured to be adapted to the ambient light intensity. As a result, the fingerprint image signals may be more immune to noise interferences, so as to improve the quality of fingerprint image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a control circuit, for controlling a fingerprint sensing operation of a display panel, the fingerprint sensing operation comprising a reset operation, an exposure operation and a sample operation, the method comprising:
    performing the reset operation, the exposure operation and the sample operation of a fingerprint sensing cycle during a display frame interval in which a polarity of display data voltage on the display panel remains unchanged; and
    adjusting an exposure time of the exposure operation to be within the display frame interval;
    wherein the display frame interval comprises a plurality of consecutive skip frames in which the exposure operation of the fingerprint sensing operation is performed.

2. The method of claim 1, wherein a length of the exposure time is not in a unit of frame time.

3. The method of claim 1, further comprising:
    performing the fingerprint sensing operation of a plurality of fingerprint sensing cycles during the display frame interval, to generate a plurality of image frames of fingerprint signals;
    wherein the plurality of image frames of fingerprint signals are averaged to obtain a fingerprint sensing result.

4. The method of claim 1, wherein the exposure time is adjusted to allow an image frame of fingerprint signals to be completely read out within the display frame interval.

5. A control circuit, for controlling a fingerprint sensing operation of a display panel, the fingerprint sensing operation comprising a reset operation, an exposure operation and a sample operation, the control circuit being configured to:
    perform the reset operation, the exposure operation and the sample operation of a fingerprint sensing cycle during a display frame interval in which a polarity of display data voltage on the display panel remains unchanged; and
    adjust an exposure time of the exposure operation to be within the display frame interval;

wherein the display frame interval comprises a plurality of consecutive skip frames in which the exposure operation of the fingerprint sensing operation is performed.

6. The control circuit of claim 5, wherein a length of the exposure time is not in a unit of frame time.

7. The control circuit of claim 5, further being configured to:
perform the fingerprint sensing operation of a plurality of fingerprint sensing cycles during the display frame interval, to generate a plurality of image frames of fingerprint signals;
wherein the plurality of image frames of fingerprint signals are averaged to obtain a fingerprint sensing result.

8. The control circuit of claim 5, wherein the exposure time is adjusted to allow an image frame of fingerprint signals to be completely read out within the display frame interval.

\* \* \* \* \*